United States Patent
Zhao et al.

(10) Patent No.: US 10,628,073 B1
(45) Date of Patent: Apr. 21, 2020

(54) COMPRESSION AND ENCRYPTION AWARE OPTIMIZED DATA MOVING ACROSS A NETWORK

(71) Applicant: EMC IP Holding Company LLC, Hopkinton, MA (US)

(72) Inventors: Junping Zhao, Beijing (CN); Kevin Xu, Warren, NJ (US); Kun Wang, Beijing (CN); Kenneth J. Taylor, Franklin, MA (US); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 364 days.

(21) Appl. No.: 15/386,935

(22) Filed: Dec. 21, 2016

(51) Int. Cl.
*G06F 3/00* (2006.01)
*G06F 3/06* (2006.01)
*G06F 21/60* (2013.01)
*H04L 29/08* (2006.01)

(52) U.S. Cl.
CPC ............ *G06F 3/0647* (2013.01); *G06F 3/064* (2013.01); *G06F 3/067* (2013.01); *G06F 3/0608* (2013.01); *G06F 3/0611* (2013.01); *G06F 3/0652* (2013.01); *G06F 21/602* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 9,558,288 B1 * | 1/2017 | Boswell | G06F 17/3089 |
| 9,785,510 B1 * | 10/2017 | Madhavarapu | G06F 11/1446 |
| 10,129,566 B2 * | 11/2018 | Sadhwani | H04N 21/85406 |
| 2017/0111328 A1 * | 4/2017 | Leon | H04L 9/14 |

* cited by examiner

*Primary Examiner* — Midys Rojas
(74) *Attorney, Agent, or Firm* — Ryan, Mason & Lewis, LLP (57) ABSTRACT

In a method of tiering data in a computing environment, data service status information is obtained at a first storage environment regarding a data service operation performed on one or more data sets that qualify for storage at a second storage environment based on a given policy, and, based on the obtained data service status information, a determination is made to store the one or more data sets at the second storage environment without performing a reverse operation of the data service operation on the one or more data sets.

20 Claims, 6 Drawing Sheets

1. CHECK FILE STATE — 502

2. RETRIEVE DATA FROM CLOUD
(FULL RECALL OR PARTIAL-RECALL VIA INDEX TABLE) — 504

3. VALIDATE DATA INTEGRITY BASED ON CHECKSUM — 506

4. RETURN PLAIN DATA TO HOST
AFTER DECRYPT AND DECOMPRESS — 508

5. WRITE THE COMPRESSED/ENCRYPTED
DATA TO DISK IF NO CHANGE — 510

FIG. 6
600

| COLD/INACTIVE DATA FILTER | RUN SCHEDULER |
|---|---|
| • LAST ACCESSED TIME | • RUN NOW |
| • LAST MODIFIED TIME | • RUN EVERY DAY AT X TIME |
| • LAST ATTRIBUTE CHANGED | • RUN ON A SPECIFIC DAY/TIME OF THE WEEK |
| • FILE SIZE | • RUN ON A SPECIFIC DAY/TIME OF THE MONTH |
| • FILE NAME/EXTENSION (WITH REGULAR EXPRESSIONS) | • RUN ONCE ON A SPECIFIC DAY/TIME IN THE FUTURE |
| • DIRECTORY NAME (INCLUDE/EXCLUDE) | • RUN WHEN CAPACITY THRESHOLD IS MET |

COMPRESSION AND ENCRYPTION AWARE OPTIMIZED DATA MOVING ACROSS A NETWORK

FIELD

The field relates generally to computing environments, and more particularly to data tiering in such computing environments.

BACKGROUND

Computing environments frequently employ cloud computing platforms, where "cloud" refers to a collective computing infrastructure that implements a cloud computing paradigm. For example, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Such computing environments are typically deployed and managed by service providers, who provide a computing environment for customers (tenants) to run their application programs (e.g. business applications or otherwise). The applications are typically run on one or more computing devices (i.e., host devices or hosts), and write data to and read data from one or more storage devices (e.g., hard disk drives, flash drives, etc.). The storage devices may be remote from the host devices (part of so-called "cloud storage") and storage devices may be local to the host (part of so-called "primary storage"), e.g., part of the same computing device(s) that implement the host. In a data tiering hierarchy, the primary storage is typically considerd a first storage tier and the cloud storage is typically considerd a second storage tier. Also, it is to be understood that an enterprise (e.g., business, university, etc.) can implement a primary storage tier internal to the enterprise, and utilize cloud storage (external to the enterprise) through a service provider when needed.

Tiering cold or inactive data from a first tier localized (e.g., enterprise) storage environment to a second tier cloud environment enables a cost-effective model for storage of data. Cold or inactive data refers to data that is rarely used or accessed. Cloud storage provides a large capacity second tier storage service that is relatively inexpensive, relying on less enterprise-level data features than primary sotrage. Existing tiering solutions generally ingest the cold/inactive data through a normal data access interface (like reading from a host), which includes reading the content, and performing decryption and/or decompression (e.g., inline or offline), which causes extra CPU processing and memory consumption, impacting overall performance.

SUMMARY

Embodiments of the invention provide techniques for improved tiering of datasets in cloud computing environments.

For example, in one embodiment, a method of tiering data in a computing environment comprises the following steps. Data service status information is obtained at a first storage environment regarding a data service operation performed on one or more data sets that qualify for storage at a second storage environment based on a given policy, and, based on the obtained data service status information, a determination is made to store the one or more data sets at the second storage environment without performing a reverse operation of the data service operation on the one or more data sets.

Advantageously, illustrative embodiments provide for techniques that optimize data tiering decisions based on an identification of whether data is in an encrypted and/or compressed state, bypassing decryption and decompression of the data, and migrating the encrypted and/or compressed data from a first storage tier to a second storage tier. The embodiments enable faster tiering throughput with less CPU and memory consumption, less network traffic and solid end-end security.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

It is realized herein that the use of data services, such as, for example, data encryption, data compression and data deduplication, in conjunction with computing environments has many advantages.

Data deduplication (or dedup as it is known in short) is a data service that segments an incoming data stream, uniquely identifies data segments, and then compares the segments to previously stored data. If the segment is unique, it is stored on disk. However, if an incoming data segment is a duplicate of what has already been stored, a reference is created to it and the segment is not stored again. For example, a file or volume that is backed up every week creates a significant amount of duplicate data. A data deduplication service analyzes the data and stores only the unique segments of a file. This process can provide an average of 10 to 30 times reduction in storage capacity requirements, with average backup retention policies on normal enterprise data. This means that companies can store 10 TB to 30 TB of backup data on 1 TB of physical disk capacity, which has huge economic benefits.

Data encryption is a data service that encodes data into a secret code, referred to as cipher text. Encryption is performed using an encryption algorithm. In order to understand encrypted data, a user must have access to a secret key or password that enables decryption to plain text. Encryption ensures that only authorized users can decrypt the encrypted data using a decryption key. Encryption services can be host based (e.g., X86 CPU or accelerated card) or drive-based such as self-encryption drive. Embodiments of the present invention may work for host based encryption, or drive-based encryption with API to return raw encrypted datasets.

Data compression is a data service that is used to compress the unique segments of a file before they are stored on disk. Data compression in a block-based storage system reduces the size of data on disk, typically increasing available capacity up to about 50 percent. Compression can typically be enabled automatically and operates in the background to avoid performance degradation.

Inline deduplication, encryption and/or compression are data services that are performed on data before or as it is being written to a storage device.

Illustrative embodiments of the present invention provide an optimized transparent data tiering approach between primary storage and cloud storage that is aware of data compression and encryption states at primary storage. Data tiering and recall from primary to cloud storage (or other type of second tier storage) is optimized using new data ingest routines and extra metadata, enabling faster tiering throughput with less CPU and memory consumption, less network traffic and solid end-end security. The embodiments of the present invention can be implemented in any storage architecture that supports one or more of the data services noted above, or integrated with existing tiering appliances such as, for example, Cloud Tiering Appliance (CTA), Fully Automated Storage Tiering (FAST.X), CloudBoost or CloudArray (available from Dell EMC of Hopkinton, Mass.). In accordance with embodiments of the present invention, a target cloud could be a public cloud, federated or private cloud.

With the new introduced data ingest routines, the embodiments enable fast data reading and quick data transfer with less CPU usage and strong end-end security. Metadata can be separately shared or copied, and tiering appliance resources (if they exist) can be saved.

Figure 1:
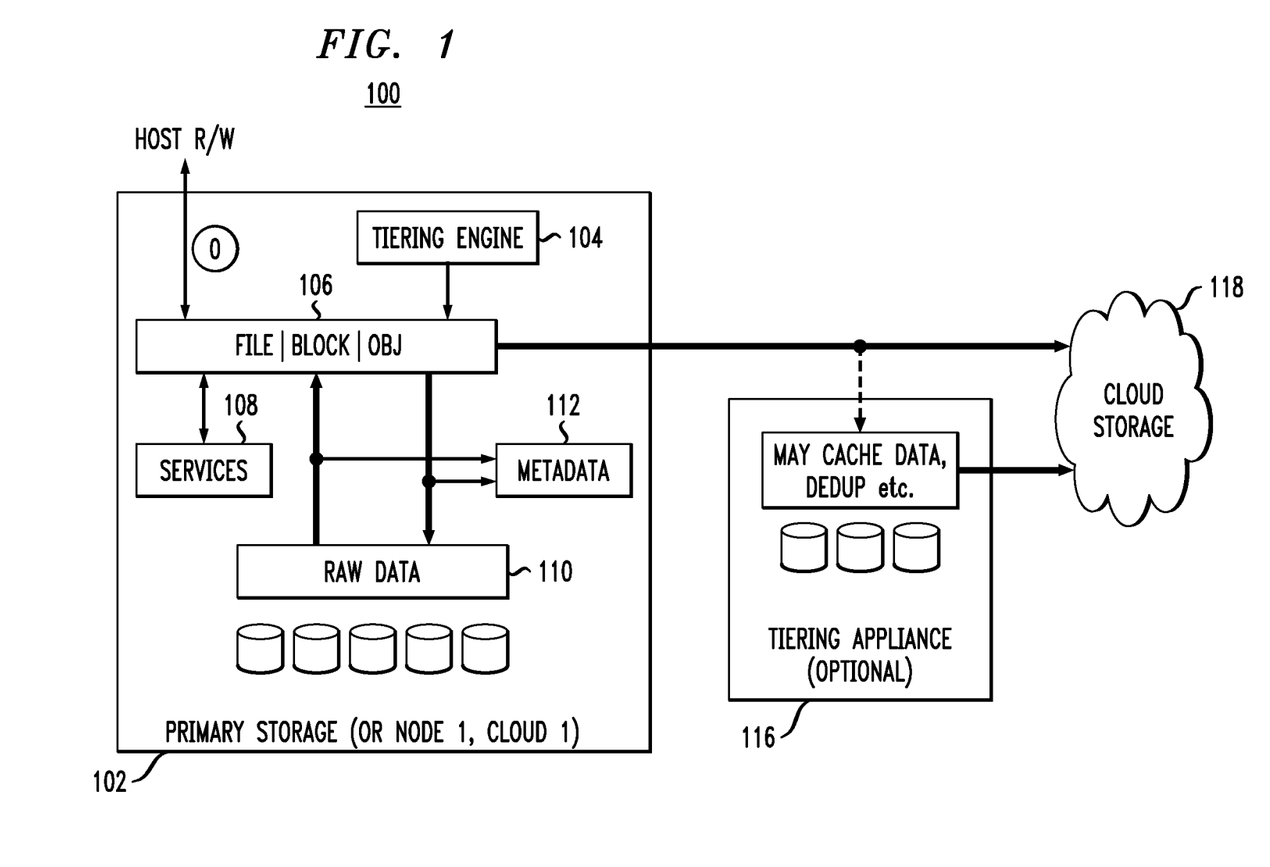
FIG. 1 illustrates an architecture for data storage with data tiering, according to an embodiment of the invention.

Referring to FIG. 1, which illustrates an architecture 100 for data storage with data tiering, according to an embodiment of the invention, a tiering appliance 116, for example, a separate physical or virtual machine (VM) node with dynamic random access memory (DRAM), or other memory, can be optionally configured to be between and operatively connected to the primary and cloud storage environments 102, 118. An example of a tiering appliance is the CTA (available from Dell EMC of Hopkinton, Mass.).

Host normal read/write (R/W) input/output (IO) operations are illustrated in Step 0, where a host reads or writes data and inline or offline encryption and/or compression of the data could be performed if the service is enabled. Encryption and/or compression is illustrated in the data services block 108. Over time some data becomes cold/inactive. Once the data becomes cold/inactive, then transparent tiering may begin to occur.

A tiering engine 104, which may run in or outside of primary storage 102, determines what types of datasets could be tiered, and when and how to execute tiering. For example, since tiering typically works in connection with cold/inactive data, determinations of when to execute tiering can be based on, for example, last access time of the data. The tiering engine can scan the datasets to determine whether tiering should occur. According to an embodiment, the tiering engine 104 includes a policy engine that includes configurable filters or combinations of filters, which can be used to flexibly locate cold/inactive datasets. The tiering engine 104 further includes a scheduler to control when to trigger tiering, and other relevant actions, e.g., enable partial recall, enable in-place recall, etc.

Figure 6:
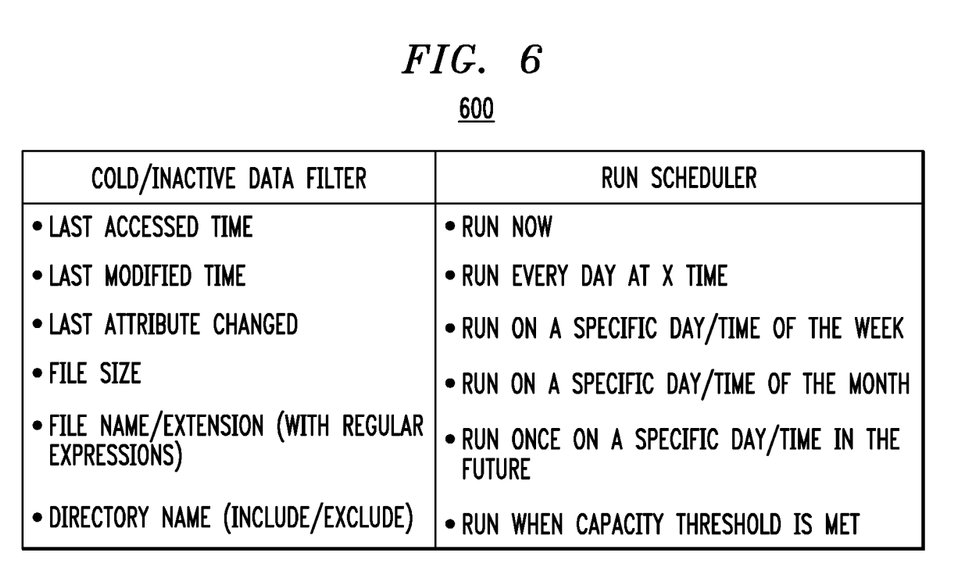
FIG. 6 is a table showing an example of a policy engine configuration, according to an embodiment of the invention.

For example, table 600 in FIG. 6 illustrates a relationship between cold/inactive data filtering by the policy engine and execution of the scheduler, according to an embodiment of the invention. In table 600, the left side of the table shows configurable criteria or policies for qualifying a data set as cold/inactive, and the right side of the table shows a configurable schedule for running the optimized tiering methodologies described herein for each of the criterion on the left side.

In a conventional transparent data tiering arrangement, triggered by a tiering engine, target data (i.e., data to be tiered) would be read out through the same process as host access, i.e., if a file is encrypted and/or compressed, it would be read, decrypted and decompressed until the plain content is obtained. Then, in the conventional arrangement, the plain data would be moved to cloud storage either directly or through a tiering appliance, like tiering appliance 116. The tiering appliance may cache the data for a period of time, compress and/or encrypt the data with its key before transferring the data to the cloud storage.

There are numerous issues with this conventional method of tiering where the target data is read out through the same process as host access, and plain data is moved to cloud storage or encrypted and compressed by the tiering appliance. For example, conventional transparent tiering skimpily ingests data through normal host read routines. Such an approach is not optimal and completely unware of data encryption or compression states at primary storage 102. For example, encrypted and compressed data does not need to be decrypted and decompressed into plain content before tiering takes place. Instead, in accordance with the embodiments of the present invention, the encrypted and compressed blocks of data can be pushed to cloud storage 118 without performing the reverse operations of decryption and/or decompression. As a result, the embodiments of the present invention eliminate decryption and decompression overhead, thereby using less of the CPU and memory, and ensure solid data security in the end-end path by passing encrypted data over a network instead of decrypted (i.e., plain) data.

As noted above, conventional approaches result in non-optimal performance and resource usage. The unnecessary decryption and decompression, and re-encryption and re-compression at the tiering appliance (if re-encryption and re-compression is performed) results in higher resource cost (CPU, memory, etc.), and increased processing time. Embodiments of the present invention streamline processing by detecting encryption and compression states of data in primary storage, and eliminating the reverse operations of decryption and decompression on the detected portions.

As noted above, conventional approaches result in security concerns when plain data (e.g., plain text) is transferred over a network to cloud storage. In addition, when a separate tiering appliance is being used for encryption, there are more components which are vulnerable to attack by potential hackers. Also, tiering appliances being used for compression and encryption result in extra hardware and management costs, such as, for example, configuration and key management costs, etc.

The optimized tiering approach, in accordance with an embodiment of the present invention, detects data compression and encryption states at primary storage 102, thereby eliminating decompression and decryption for tiering, and maintaining relevant extra metadata 112. As a result, CPU and memory resources are saved, and overall performance and security are increased.

As noted above, the tiering engine 104 identifies cold/inactive data based on configurable policies, and the target data is read. If the data is in an encrypted and/or compressed state, the data is not decompressed and/or decrypted. Instead, relevant metadata 112 is updated to track the state of the data and extra indexing is performed.

Figure 2:
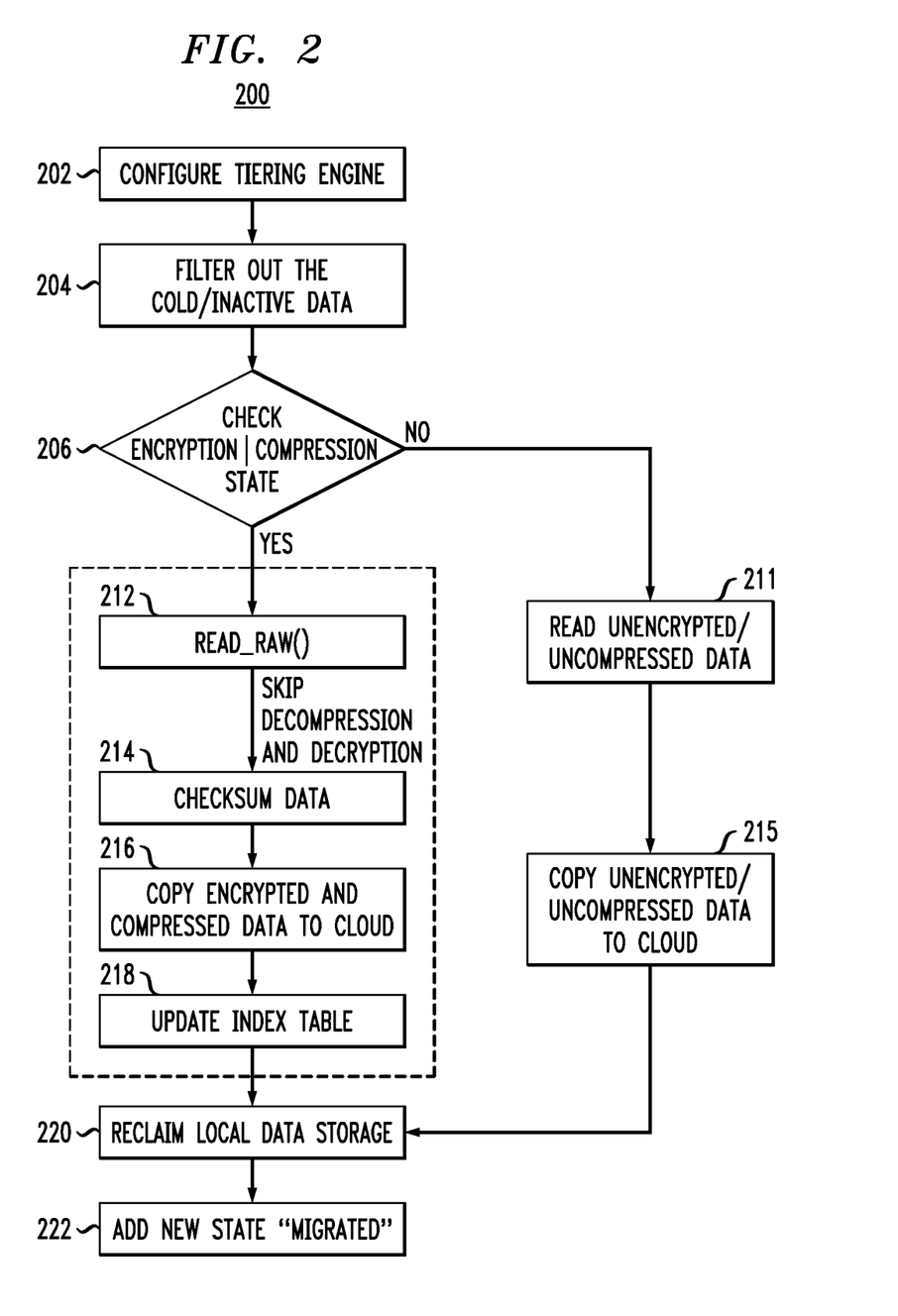
FIG. 2 illustrates an optimized data tiering process, according to an embodiment of the invention.

Tiering can be implemented in a push fashion, where the tiering engine 104 ingests cold/inactive data and the data is written to cloud storage 118. Referring to FIG. 2, which is a flow diagram illustrating an optimized data tiering process 200, according to an embodiment of the invention, the tiering engine 104 is configured (block 202) with the criteria or policies for qualifying a data set as cold/inactive, and a schedule for running the optimized tiering methodologies. At block 204, the data determined to be cold/inactive is filtered from the remaining data as the target data, and at block 206 the encryption and compression states of the target data are checked and it is determined whether the target data is encrypted and/or compressed.

Depending on how encryption and/or compression is implemented (e.g., file-level encryption/compression), flags will be present in metadata 112 (e.g., file metadata), such as inode or another data structures which describe a filesystem object, to denote that a file is encrypted and/or compressed. Filesystem object attributes may include metadata corresponding to, for example, times of modification, access, and encryption and compression status.

Upon a determination that certain target files have been encrypted and/or compressed, as per block 212, a new flag READ RAW, which is a parameter specifying reading the raw data 110 and skipping any decryption/decompression, is added to the metadata 112 for the identified encrypted and/or compressed files. Based on the new flag, the raw dataset is read from a disk or other memory location in which the raw dataset is located. In accordance with an embodiment of the present invention, the raw dataset is read through a new interface, such as, for example, read raw( ) which skips decompression and encryption, thereby resulting in higher read performance and reduced CPU and memory consumption. The new interface is a simplified interface, such as if from implementation view, and can be generated by modifying the existing read interface.

To ensure end-end integrity of the data, before moving the data over a network, in block 214, data checksum (e.g., checksum per block or per file) is calculated if checksum is not already available. Checksum can be calculated using, for example, a checksum function or algorithm. Depending on a configuration of a system in accordance with an embodiment of the present invention, the checksum may be attached to data as metadata and written into cloud storage. As a result, the data checksum can be used to validate data integrity when accessing the data from cloud storage. Alternatively, the checksum may only be kept at local primary storage, so that data integrity can be validated upon data recall from cloud storage. As described in further detail below, to better support partial data recall, an extra index table is generated as metadata. Referring to FIG. 1, and to block 216 of FIG. 2, the raw data 110 is copied to the cloud storage 118, which can include, but is not necessarily limited to, object storage such as Elastic Cloud Storage (ECS) (available from Dell EMC of Hopkinton, Mass.), where the file state "Tiering" is added. In comparison with conventional methods of tiering, the tiering in accordance with embodiments of the present invention, results in faster data transfer due to the data being in compressed format, more secure data movement since whether the dataset is in primary storage 102, being transmitted over a network, or in cloud storage 118, the data is always encrypted, and reduced appliance and/or management costs, since separate appliances to perform duplicate compression or encryption before transferring to cloud storage are not required. In addition, encryption keys can be managed at a single location. For example, the key can be kept in local storage or shared and managed through a separate security channel.

Referring to FIG. 1, if there is a tiering appliance, such as tiering appliance 116 already deployed between primary storage 102 and cloud storage 118, which supports functions such as compression, encryption, de-duplication, aggregation etc., a data tag, such as, for example, "encrypted"/"compressed" is added as part of metadata 112 for corresponding data files, to denote that an ingested streaming/file is already processed, and it not necessary to perform encryption/compression again on the file(s) to which the tag applies. Rather, tiering appliance resources can be used to handle other incoming traffic that may need to be compressed/encrypted, or that may need other operations, such as, for example, caching, deduplication, etc.

Referring to block 218, an index table, if one is used, is updated. As explained in further detail below in connection with FIG. 4, an index table is used for partial recall operations. An index table can include compact and efficient metadata that maintains offset mapping pairs generated during data tiering, and used to speedup partial recall.

Once tiering to cloud storage 118 is performed, as per block 220 in FIG. 2, local data contents are deleted, thus reclaiming storage. Relevant metadata 112 (e.g., inode), which includes information on states, keys, etc. (e.g., Compressed Encrypted Migrated in FIG. 3) and a stub file, which includes information about cloud location such as URL/UUID or any necessary authentication information, are maintained.

The metadata 112 that is maintained for optimized tiering and recall includes, for example, the following information: (1) Data state: such as, compressed, encrypted, tiering/recalling state; (2) Data encryption key: depending on the encryption algorithm, the relevant configuration and/or key to encrypt/decrypt a dataset is maintained; (3) Data checksum: to validate end-end data integrity, so that data changes or corruption can be detected before return of the data to an application or user; and (4) Cloud access authentication and data location: such as, UUID, URL etc.

In accordance with an embodiment of the present invention, as shown in FIG. 2, if it is determined at block 206 that there is no encryption or compression, the method can proceed to blocks 211 and 215, where the unencrypted/uncompressed data is read and copied to the cloud storage environment. After copying at block 215, local data storage can be reclaimed as per block 220, as discussed above.

While the embodiments of the present invention are discussed in connection with tiering of data between localized primary storage to cloud storage environments, the embodiments of the present invention are not necessarily limited thereto. For example, embodiments of the present invention can apply to movement of data between any types of datacenters over a network, such as, for example, between two or more cloud storage environments (e.g., cloud1 and cloud2) or between two or more non-cloud nodes over a network (e.g., node1 and node2).

Figure 3:
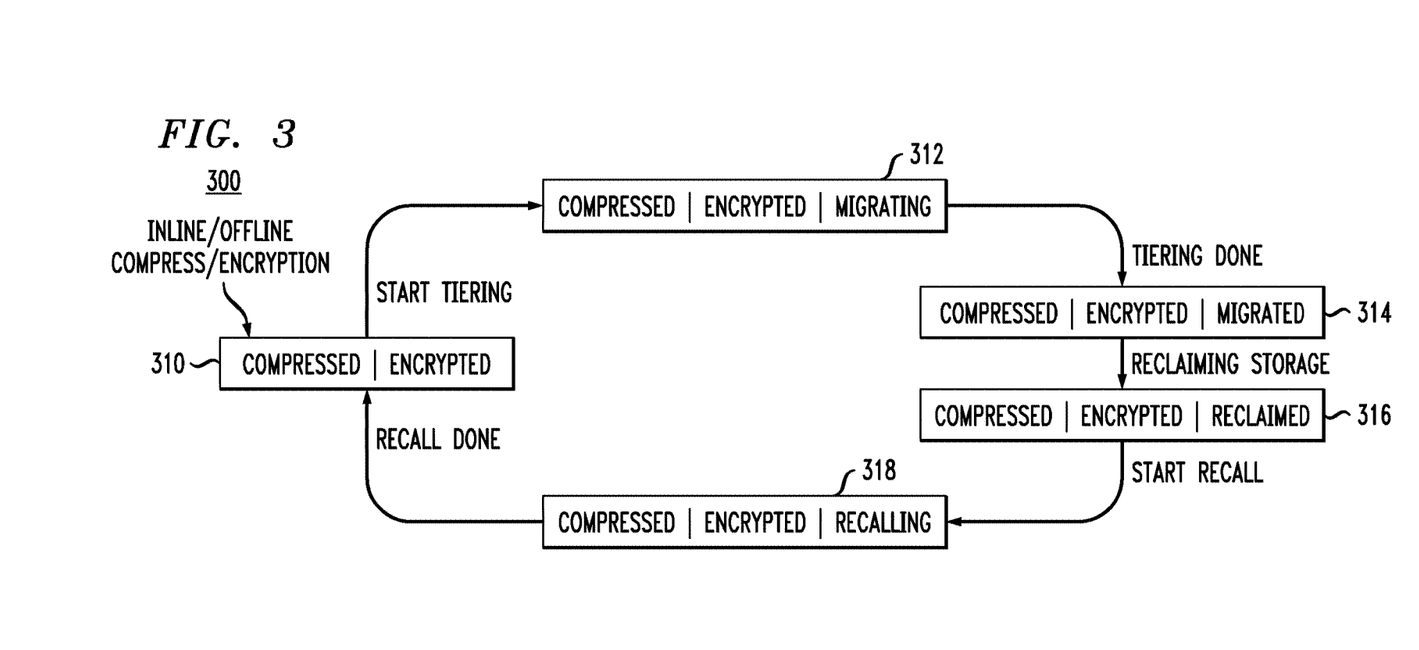
FIG. 3 illustrates data states and transformation during data tiering and retrieval, according to an embodiment of the invention.

FIG. 3 illustrates a flow 300 of data states and transformation during data tiering and retrieval, according to an embodiment of the invention. Referring to FIG. 3, data is in a compressed|encrypted state 310 prior to tiering, brought about by, for example, inline or offline encryption and/or compression of the data performed when a host reads or writes data (step 0) in FIG. 1. Tiering is commenced, and the data is in a compressed|encrypted|migrating state 312 since the data is being migrated to cloud storage. After tiering is completed, the data is in a compressed|encrypted|migrated state 314. Referring back to FIG. 2, after tiering is completed the "migrated" state is added to the metadata 112 (see block 222). Then storage is reclaimed in the primary storage to result in a compressed|encrypted|reclaimed state 316. After data recall is started, the data is in a compressed|encrypted|recalling state 318, and returns to the compressed|encrypted state 310 after recall is completed. Each of the states 310, 312, 314, 316 and 318 can be identified in metadata 112.

Figure 4:
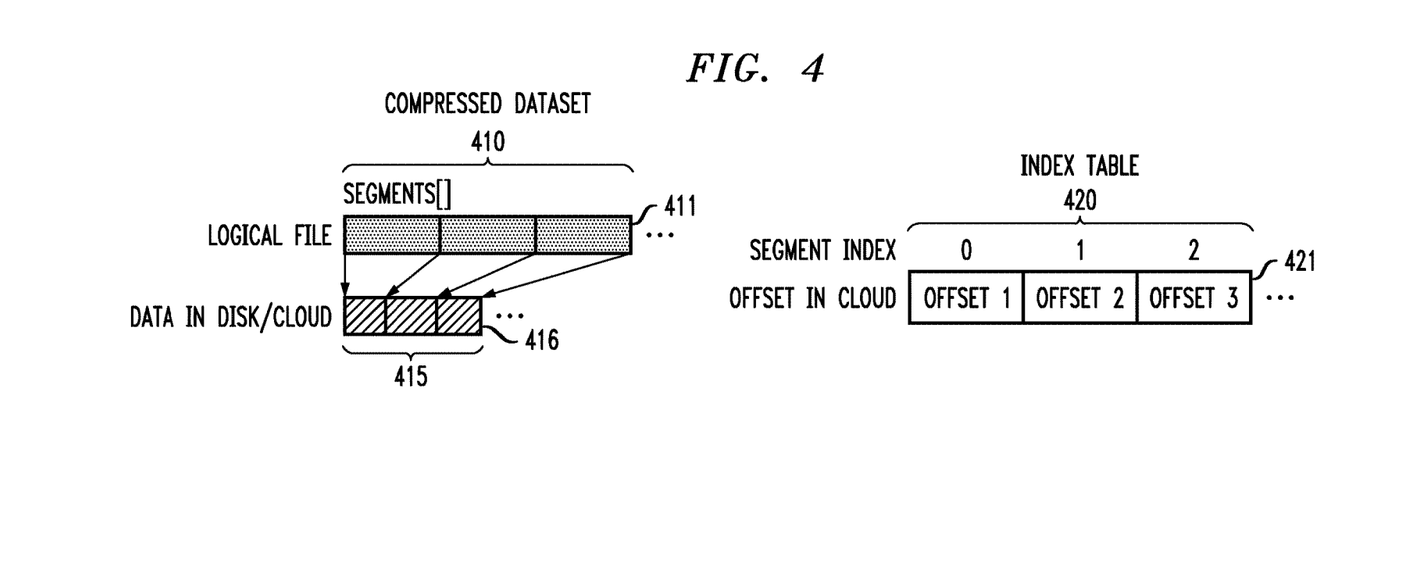
FIG. 4 illustrates an index table to support partial recall, according to an embodiment of the invention.

FIG. 4 illustrates an index table to support partial recall, according to an embodiment of the invention. Partial recall refers to retrieving exact blocks of data needed rather than recalling an entire file. In accordance with an embodiment of the present invention, to better support partial recall, an extra index table 420 is generated during tiering. Using fixed-length compression as an example, a logical file 410 consists of a plurality of logical segments 411. For example, each segment 411 is 32 KB. In a non-limiting illustrative example, logical file 410, for sake of explanation is referred to as "fileA", and from a user's perspective is 100 MB for example. After compression, for example, fixed-size segment by segment compression, the file, may only consume 50 MB of disk storage. Thus, as shown in FIG. 4, every logical segment 411 can be, for example, 32 KB, and is compressed into smaller sized segments 416, such as, for example, 4 KB, 8 KB, etc. Compressed raw data 415 is read from a disk or other memory element in primary storage and the smaller sized segments 416 are moved to cloud storage as consecutive data streams.

Partial recall refers to accessing, for example, by a user from cloud storage, a specific data range in a file(s) (e.g., 1 MB-10 MB), rather than recalling an entire file(s), which may be unnecessary and costly. In order to perform such recall, a system needs to know the corresponding location (offset) in the cloud storage given an original file offset. The index or index table 420 includes actual offsets 421 after compression/encryption stored in the cloud in correspondence with logical offset of respective segments 411 of a logical file 410. Such index 420 is used for quick partial recall. The index can include optimized compact enough metadata or key-value mapping pair, where the "key" corresponds to the original file's offset in segment #, and the "value" corresponds to the location (offsets 421) in the cloud. The metadata associated with the index table 420 for partial recall may be stored in a separate small file (e.g., stub file) or any well-organized database. For example, in accordance with an embodiment of the present invention, a system maintains information regarding to which cloud file or object each local file/data is tiering, for example, by storing such information in a local stub-file.

Referring to the illustrative example, if fileA moves to cloud storage as objectO1, file.segment #0 is stored in objectO1.offset100, file.segment #1 is stored in objectO2.offset101, etc. The cloud may provide file storage the same as or similar to a local shared directory, or object storage given a unique objectID. As a result, local file(s)/data may move into cloud storage as another file or object. According to an embodiment, multiple local files, e.g., "fileA/B/C" can move into the same ObjectO1 in cloud storage, where each file is stored at different (unique) offsets of ObjectO1.

Referring back to FIG. 1, encrypted and compressed data are transmitted from primary storage 102 over a network to cloud storage 118 directly or through an optional separate tiering appliance 116, where data may be cached, deduplicated or aggregated, but is not compressed or encrypted. Once the transmission is complete, portions of primary storage 102 which held the transmitted data are reclaimed. Relevant metadata 112 for the transmitted data is, for example, marked with a "Migrated" state, and corresponded to a location in cloud storage 118, and includes additional information that would be necessary or helpful for transparent recall.

Figure 5:
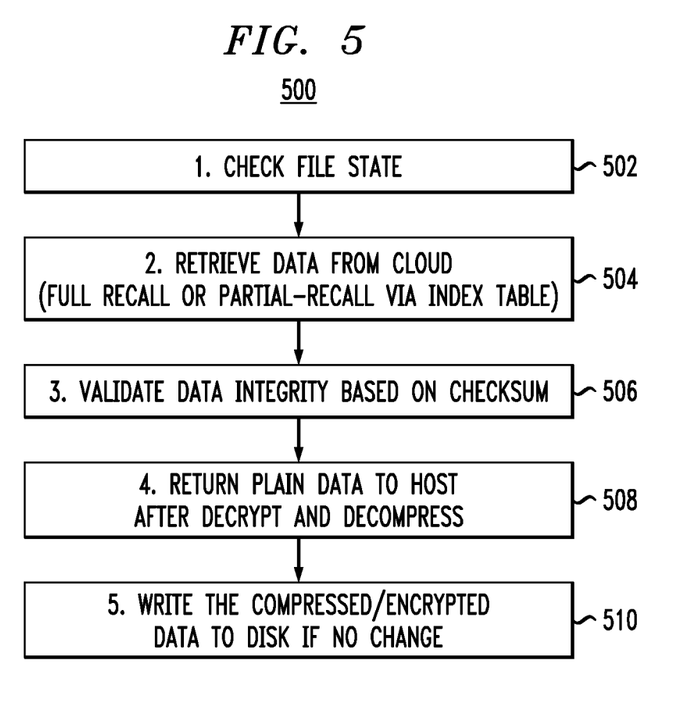
FIG. 5 illustrates a process for transparent and optimized data recall, according to an embodiment of the invention.

Comparing to existing solutions, the embodiments of the present invention result in faster in-place recall, where data is written to primary storage without extra compression and/or encryption. Referring to FIG. 5, which illustrates a process 500 for transparent and optimized data recall, according to an embodiment of the invention, when a data file(s) is accessed by a host, the state of the data file(s) is checked (block 502). For example, referring to FIG. 3, the state can be one of states 310-318, such as "Compressed|Encrypted|Migrated" 314.

Then, at block 504, the dataset is retrieved from the cloud storage. Since data is in the compressed/encrypted format, network transferring is faster and security is enhanced as compared to when the data is not in the compressed/encrypted format. Full recall (the whole file is recalled) or partial recall (only a specified data range is recalled) is performed. For partial recall, the index table 420 is looked up to locate the actual offset. Location information in cloud storage can be found via, for example, a stub file (which maintains URL and/or UUID information).

At block 506, when we retrieve a dataset from cloud storage, data integrity is validated by re-generating and compare data checksums, so as to detect any change or corruption to the data. At block 508, if no integrity issue is found, cipher text is decrypted based on a locally maintained key (e.g. in primary storage) and the plain content is returned to the host. Embodiments of the present invention can support in-place recall (recalled data is written to a local disk) or in-mem recall (recalled data is not written to local storage when the recalled data is cold/inactive data). Referring to block 510, for in-place recall, since data is already encrypted/compressed, there is no need encrypt/compress again if there is no change in the data. Accordingly, when there is no change to the data, the encrypted/compressed data is written to the disk and the "Migrated" state is removed.

The embodiments of the present invention do not require prerequisites of cloud (or second tier) storage, as long as the second tier storage provides a basic data store (such as Amazon S3 object storage, available from Amazon Web Services, Inc.) and access interfaces (e.g., put/get). The embodiments can apply to either file, block or object primary storage (see element 106 of FIG. 1). For example, between primary and cloud storage environments, primary storage may expose file, block and/or object interfaces (or a Hadoop Distributed File System (HDFS) or other file system). For illustration purposes, we largely refer to file primary storage as examples, but the embodiments of the present invention are not limited thereto. The embodiments are transparent to normal host access.

Illustrative embodiments of the present invention identify data states like compressed/encrypted states in primary storage. With that information, the data read and tiering paths are optimized, which improves performance, reduces network traffic and enables end-end security. By maintaining extra states and metadata, the embodiments also optimize data recall and/or retrieval, including faster data transfer, less resource utilization, etc., since datasets are not re-compressed/re-encrypt in case of in-place recall. The embodiments use extra metadata identifiers to track data state changes during tiering and recall, and facilitate fast operations, such as encryption, partial recall, etc. The metadata (e.g., metadata 112) may be kept in local storage so that access to the metadata is fast and secure. For example, an encryption key is not moved to cloud storage, enabling simplified security management.

Moving an encryption key generally does not save an appreciable amount of storage since the key occupies a small amount of storage space. As can be understood, encryption keys are crucial for security, and thus typically require secured handling. As noted, one possible approach is to keep the key in local storage. Another approach is to move or share the key via a separate out-of-band channel, which is a communication channel different from that used for data tiering. For example, a key can be moved through different software or trusted networking paths.

According to embodiments of the present invention, data in cloud storage remains in the encrypted and/or compressed state, which provides security against information leaks or hacks. In accordance with an embodiment of the present invention, data is only accessible from primary storage during recall. Embodiments of the present invention also support copying of partial or full metadata via separate out-of-band channels to another node or site, which enables other device(s) to access data in cloud storage with granted permission. Accordingly, the embodiments enable movement and replication of data and metadata along separate channels.

In accordance with an embodiment of the present invention, partial or full metadata can be exported and copied from primary storage to a second device (which may be, for example, one or multiple storage nodes, or a mobile device) through separate secure networking (e.g., secure sockets layer (SSL)), so that with metadata information, such as an encryption/decryption key, data offset information, cloud authentication and data location information, the second node can normally access the data in cloud storage.

With this approach, data tiering and sharing can be separated. Tiering is focused on performance, integrity and security, etc. as explained herein, while sharing first is about metadata sharing, and then focuses on control and security. Between export and import, permissions (e.g., read-only (RO), read and write (RW), able or not able to propagate metadata to 2nd device, etc.) or valid access time periods (e.g., days, months, etc.) are assigned in connection with the second device, that ensure data sharing.

Figure 7A:
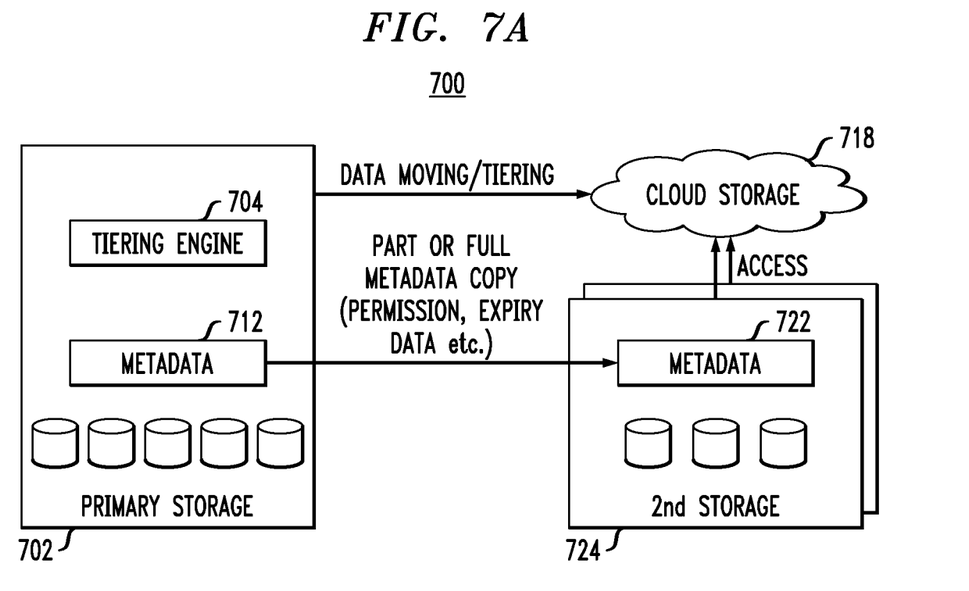
FIG. 7A illustrates an architecture for sharing data in a cloud with metadata replication and control, according to an embodiment of the invention.
Figure 7B:
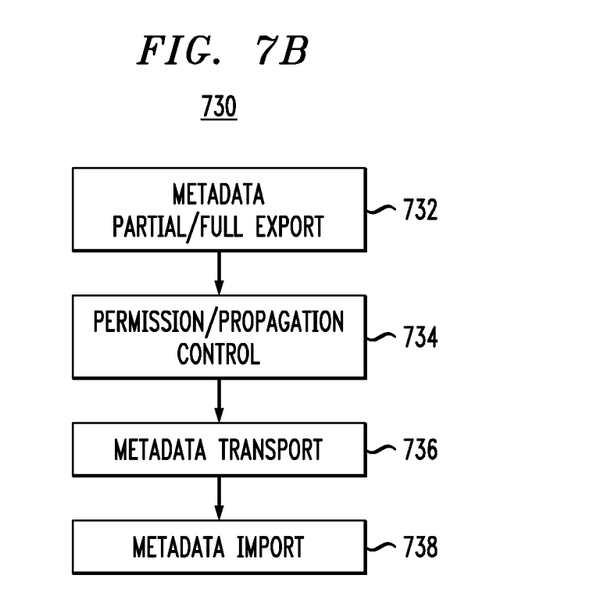
FIG. 7B illustrates process for sharing data in a cloud with metadata replication and control, according to an embodiment of the invention.

FIGS. 7A and 7B respectively illustrate an architecture and process for sharing data in a cloud with metadata replication and control, according to an embodiment of the invention. Referring to FIG. 7A, the architecture 700 includes the primary storage 702 (e.g., node 1) including a tiering engine 704 and metadata 712. As noted above, in accordance with an embodiment of the present invention, partial or full metadata 712 is exported and copied from primary storage 702 to second storage 724 (e.g., node 2) including the copied metadata 722. The second storage 724 (or node/site) can be a device which normally accesses the tiered/recalled data in cloud storage 718.

Referring to FIG. 7B, a process 730 for sharing data in a cloud with metadata replication and control includes, at block 732 partial and/or full metadata export from primary storage to a second device, at block 734 assignment of permissions and propagation control in connection with the second device, and at blocks 736 and 738, metadata transport and import. In accordance with an embodiment of the present invention, metadata is transmitted from a node/site that is moving/tiering the data (e.g. primary storage 702), and metadata is imported to a node/site that accesses the moved/tiered data (e.g., second storage 724). By moving the metadata a separate channel (e.g., different node/site) can access encrypted data from cloud storage 718.

Figure 8:
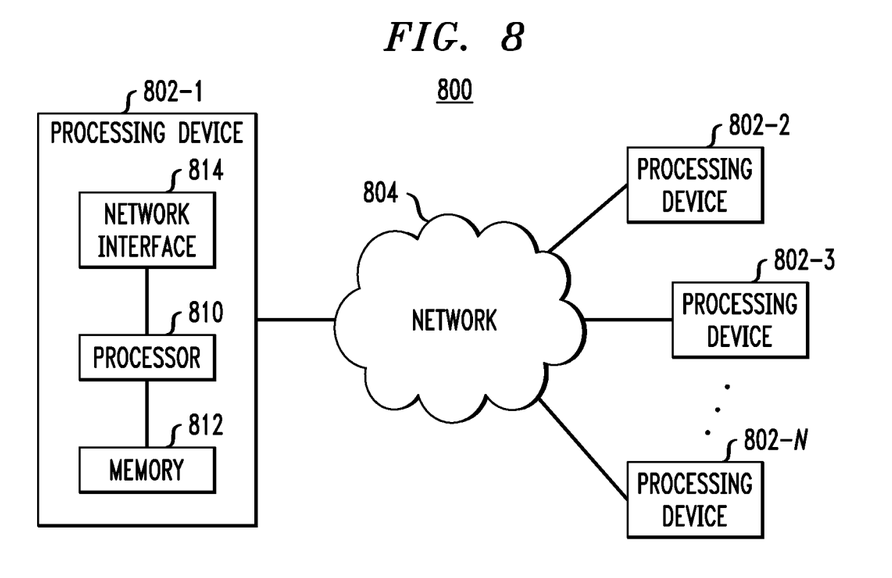
FIG. 8 illustrates a processing platform used to implement a data storage environment with data tiering, according to an embodiment of the invention.

FIG. 8 illustrates a processing platform used to implement a computing environment with optimized data tiering based on data service status, according to an embodiment of the invention. As an example of a processing platform on which a computing environment with optimized tiering functionalities (e.g., FIGS. 1-6, 7A-7B) can be implemented is processing platform 800 shown in FIG. 8. It is to be appreciated that processing platform 800 may implement the functionalities described herein. For example, the various architectures and methodologies of FIGS. 1-9 can be implemented in processing platform 800.

The processing platform 800 in this embodiment comprises a plurality of processing devices, denoted 802-1, 802-2, 802-3, . . . 802-N, which communicate with one another over a network 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-6 and 7A-7B. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the system shown as 800 in FIG. 8 may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   obtaining data service status information at a first storage environment regarding a data service operation performed on one or more data sets that qualify for storage at a second storage environment based on a given policy; and
   determining, based on the obtained data service status information, to store the one or more data sets at the second storage environment without performing a reverse operation of the data service operation on the one or more data sets;
   wherein determining to store includes evaluating metadata of the one or more data sets to detect at least one of an encrypted status and a compressed status of the one or more data sets, the metadata comprising a specification of the at least one of the encrypted status and the compressed status; and
   wherein the obtaining and determining steps are performed via one or more processing devices.

2. The method of claim 1, wherein the first storage environment comprises a local storage tier comprising storage of a local host device, and the second storage environment comprises a remote storage tier comprising cloud storage of a cloud storage device remote from the local host device.

3. The method of claim 1, wherein the one or more data sets comprise one or more data files.

4. The method of claim 1, wherein the step of determining further comprises detecting each of the encryption status and the compression status for the one or more data sets.

5. The method of claim 1, wherein the reverse operation of the data service operation comprises at least one of decryption and decompression.

6. The method of claim 1, wherein the one or more data sets includes raw data, and further comprising adding to metadata for the one or more data sets, based on the obtained data service status information, a parameter specifying that the raw data of the one or more data sets be read from the first storage environment.

7. The method of claim 1, further comprising adding to metadata for the one or more data sets, based on the obtained data service status information, a parameter specifying non-performance of the reverse operation.

8. The method of claim 1, further comprising reclaiming the storage capacity at the first storage environment for the one or more data sets stored at the second storage environment.

9. The method of claim 1, wherein metadata for the one or more data sets comprises a specification of at least one of a tiering state wherein the one or more data sets are being migrated to the second storage environment and a recalling state where the one or more data sets are being recalled from the second storage environment for return to the first storage environment.

10. The method of claim 1, wherein metadata for the one or more data sets comprises a specification of data encryption key for the one or more datasets.

11. The method of claim 1, wherein the given policy comprises at least one criterion for determining whether or not the one or more data sets qualify for remote storage.

12. The method of claim 11, wherein the at least one criterion is a determination that a data set is cold or inactive.

13. A system, comprising:
    at least one processor, coupled to a memory, and configured to:
    obtain data service status information at a first storage environment regarding a data service operation performed on one or more data sets that qualify for storage at a second storage environment based on a given policy; and determine, based on the obtained data service status information, to store the one or more data sets at the second storage environment without performing a reverse operation of the data service operation on the one or more data sets;

wherein determining to store includes evaluating metadata of the one or more data sets to detect at least one of an encrypted status and a compressed status of the one or more data sets, the metadata comprising a specification of the at least one of the encrypted status and the compressed status.

14. The system of claim 13, wherein the reverse operation of the data service operation comprises at least one of decryption and decompression.

15. The system of claim 13, wherein the at least one processor is further configured to:

add to metadata for the one or more data sets, based on the obtained data service status information, a parameter specifying non-performance of the reverse operation.

16. The system of claim 15, wherein the reverse operation of the data service operation comprises at least one of decryption and decompression.

17. The system of claim 13, wherein metadata for the one or more data sets comprises a specification of data encryption key for the one or more datasets.

18. An article of manufacture comprising a processor-readable storage medium having encoded therein executable code of one or more software programs, wherein the one or more software programs when executed by at least one processing device implement the steps of:

obtaining data service status information at a first storage environment regarding a data service operation performed on one or more data sets that qualify for storage at a second storage environment based on a given policy; and determining, based on the obtained data service status information, to store the one or more data sets at the second storage environment without performing a reverse operation of the data service operation on the one or more data sets;

wherein determining to store includes evaluating metadata of the one or more data sets to detect at least one of an encrypted status and a compressed status of the one or more data sets, the metadata comprising a specification of the at least one of the encrypted status and the compressed status.

19. The article of manufacture of claim 18, wherein the at least one processing device is further configured implement the step of:

adding to metadata for the one or more data sets, based on the obtained data service status information, a parameter specifying non-performance of the reverse operation.

20. The article of manufacture of claim 19, wherein the reverse operation of the data service operation comprises at least one of decryption and decompression.

* * * * *